United States Patent
Bai et al.

(10) Patent No.: US 12,276,837 B2
(45) Date of Patent: Apr. 15, 2025

(54) DOUBLE-PARAMETER IN-SITU SENSOR BASED ON WAVEGUIDE GRATING, A SENSING SYSTEM AND A PREPARATION METHOD

(71) Applicant: North University of China, Shanxi (CN)

(72) Inventors: Jiandong Bai, Shanxi (CN); Xinyu Zhao, Shanxi (CN); Xiaoyu Gao, Shanxi (CN); Yongqiu Zheng, Shanxi (CN); Chenyang Xue, Shanxi (CN)

( * ) Notice: Subject to any disclaimer, the term of this patent is extended or adjusted under 35 U.S.C. 154(b) by 117 days.

(21) Appl. No.: 18/338,720

(22) Filed: Jun. 21, 2023

(65) Prior Publication Data
US 2024/0003715 A1    Jan. 4, 2024

(30) Foreign Application Priority Data

Jul. 1, 2022  (CN) .......................... 202210764173.5

(51) Int. Cl.
    G02B 6/124   (2006.01)
    G02B 6/02    (2006.01)
    G02B 6/12    (2006.01)

(52) U.S. Cl.
    CPC .......... G02B 6/124 (2013.01); *G02B 6/02123* (2013.01); *G02B 2006/12138* (2013.01)

(58) Field of Classification Search
    CPC .............. G02B 2006/12138; G02B 6/12; G02B 6/124; G01H 9/00; G01H 9/004; G01K 11/32; G01K 11/3206
    See application file for complete search history.

(56) References Cited

U.S. PATENT DOCUMENTS

2022/0299359 A1*  9/2022  Zheng ................... G01H 17/00

FOREIGN PATENT DOCUMENTS

WO    WO 01/22542 A2 *  3/2001

OTHER PUBLICATIONS

English translation of first office action in China application 202210764173.5, dated Aug. 8, 2022. (Year: 2022).*

* cited by examiner

*Primary Examiner* — Michael Stahl

(57) ABSTRACT

The invention relates to the field of sensing technology, and discloses a double-parameter in-situ sensor based on waveguide grating, a sensing system and a preparation method. The sensor comprises an optical waveguide substrate, wherein a first straight optical waveguide and a second straight optical waveguide are arranged in the optical waveguide substrate in parallel, two ends of first straight optical waveguide are respectively connected with a first transmission fiber and a second transmission fiber, two ends of second straight optical waveguide are respectively connected with a third transmission fiber and a fourth transmission fiber, a first Bragg grating is arranged on the first straight optical waveguide, a second Bragg grating and a third Bragg grating are separately arranged on the second straight optical waveguide, a micro air groove is arranged on the upper surface of optical waveguide substrate, positioned between the second Bragg grating and the third Bragg grating.

9 Claims, 4 Drawing Sheets

DOUBLE-PARAMETER IN-SITU SENSOR BASED ON WAVEGUIDE GRATING, A SENSING SYSTEM AND A PREPARATION METHOD

1. TECHNICAL FIELD

The invention relates to the field of sensing technology, specifically relating to a double-parameter in-situ sensor based on waveguide grating, a sensing system and a preparation method.

2. BACKGROUND ART

The working process of some large-scale instruments and equipment related to oil exploitation, nuclear energy development and other fields is accompanied by extreme and complex environments such as high temperature and high pressure, accordingly internal working parts are easily interfered by various factors such as heat and sound, greatly influencing the working stability of the equipment. Comprehensive actions of various factors such as high temperature, noise and the like can incur problems of abnormal work and inaccurate data of a plurality of devices, and even leading to explosion disintegration under the serious condition. In conclusion, realization of the in-situ synchronous testing of the temperature-sound double parameters has important significance for mastering the rule of internal energy conversion in the working process of large-scale equipment in many fields and preventing safety accidents.

At present, researchers have many tests on single physical quantity in high-temperature and high-pressure environments, but it is still relatively lack of research results in multi-parameter synchronous tests in extreme environments and complex conditions of high-temperature and high-pressure. sensor for testing a single physical quantity, such as temperature sensor, mostly adopting thermocouple as the sensitive unit and is difficult to meet the multi-parameter testing requirements under extreme severe environments such as high temperature and high pressure. Partial sensors utilize the fiber grating to sense the temperature, and the waveguide grating is similar to the fiber grating in sensing principle and has the advantages of small size, high reliability, high sensitivity, no electromagnetic interference, etc. The structure of the optical fiber sound sensor is more applied to a Mach-Zehnder interference structure and Fabry-Perot interference structure, and the sound sensor prepared based on the Fabry-Perot interference cavity is a research hotspot in recent years. Commonly used optic fiber Fabry-Perot interferometer structure has grating and fiber end face, corrodes the fiber core to form air chamber, fiber end face-air-fiber end face, and fiber end face-air-membrane, etc. These structures often use the optic fiber end face as the plane of reflection, the Fabry-Perot cavity formed has lower fineness and relatively poor sensing sensitivity, which is difficult to satisfy the acoustic signal measurement demand under the adverse circumstances of high temperature and high pressure. And when some sensors use a single structure to sense multiple parameters, cross sensitivity phenomena often exist, making it difficult to conduct accurate measurement.

3. SUMMARY OF THE INVENTION

The invention overcomes shortcoming in the prior art, and the problem to be solved by the invention is to provide a double-parameter in-situ sensor based on waveguide grating, thereby realizing time-space synchronous in-situ measurement of temperature-sound and improves the measurement precision.

In order to solve above technical problems, the invention adopts the following technical scheme: a double-parameter in-situ sensor based on waveguide grating, comprising an optical waveguide substrate, wherein a first straight optical waveguide and a second straight optical waveguide are arranged in the optical waveguide substrate in parallel, two ends of the first straight optical waveguide are respectively connected with a first transmission fiber and a second transmission fiber, two ends of the second straight optical waveguide are respectively connected with a third transmission fiber and a fourth transmission fiber, a first Bragg grating is arranged on the first straight optical waveguide, a second Bragg grating and a third Bragg grating are separately arranged on the second straight optical waveguide, a micro air groove is arranged on the upper surface of the optical waveguide substrate, and is positioned between the second Bragg grating and the third Bragg grating.

The first straight optical waveguide and second straight optical waveguide are solid germanium-doped silicon dioxide crystal.

The material for said optical waveguide substrate is silicon dioxide.

The reflectivity of said second Bragg grating and third Bragg grating is more than 60%.

The reflectivity of said first Bragg grating is more than 60%.

In addition, the invention also provides a double-parameter sensing system based on waveguide grating, comprising a light source, a first signal analyzer, a second signal analyzer, a signal processor and a double-parameter in-situ sensor based on waveguide grating optical grating;

Said light source is used to provide optical signal for said first transmission fiber and fourth transmission fiber; said first signal analyzer is used to receive the optical signal output by second transmission fiber, and obtain the first optical spectrum; said second signal analyzer is used to receive the optical signal output by third transmission fiber, and obtain the second optical spectrum;

Said signal processor is used to calculate according to said first optical spectrum to obtain the temperature signal, and to calculate according to said second optical spectrum to obtain the acoustic signal;

In addition, the invention also provides a preparation method for a double-parameter sensor based on waveguide grating, comprising the following steps:

S1. Growing silicon dioxide on the silicon substrate to form silicon dioxide layer, and growing germanium-doped silicon dioxide on the silicon dioxide layer to form germanium-doped silicon dioxide layer;

S2. Arranging a photomask on the germanium-doped silicon dioxide layer, etching the redundant germanium-doped silicon dioxide by reactive ion etching, and forming a first straight optical waveguide and a second straight optical waveguide on the silicon dioxide layer;

S3. Growing silicon dioxide on the silicon dioxide layer by using plasma enhanced chemical vapor deposition method to form an upper cladding;

S4. Arranging an alignment plate, and etching the upper surface of the upper cladding by reactive ion etching to form a micro air groove;

S5. Coupling transmission fibers at two ends of the first straight optical waveguide and the second straight optical waveguide;

S6. Respectively inscribing the first straight optical waveguide and the second straight optical waveguide by using the line-by-line scanning method of femtosecond laser to form the first Bragg grating, second Bragg grating and third Bragg grating.

In said step S1, the thickness of silicon dioxide layer is 15±3 μm, while the thickness of germanium-doped silicon dioxide layer is 6.5±2 μm.

The depth of said micro air groove is smaller than the thickness of said upper cladding.

Compared with the prior art, the invention has following advantages:

1. The whole structure of the invention is made of silicon dioxide single crystal and is a homogeneous material integrated structure, which can eliminate high-temperature stress mismatch, ensure high-reliability work of the sensor under high-temperature conditions, and has applicability under normal temperature, normal pressure and other temperature and pressure environments, without being limited to high-temperature and high-pressure environments.
2. In the invention, the temperature sensing structure is Bragg grating on solid straight optical waveguide; its sound sensing structure is a structure with an opening at the upper end of Fabry-Perot cavity, and sealed cavity structure does not exist, thus ensuring the high-reliability work of the sensor under the high-pressure condition.
3. In the invention, the Bragg gratings in the temperature sensing structure and the sound sensing structure are both scanned and inscribed layer-by-layer via femtosecond laser, which is characterized in high reflectivity, replacing the traditional high-reflectivity dielectric film or metal film constituting Fabry-Perot cavity, and ensuring the high reflectivity of light in high-temperature environment.
4. In the invention, two sensing structures are mutually independent so as to avoid the problem of cross coupling of two parameters; meanwhile, the integrated structure of double parameter integration has small volume, and can realize the time-space synchronous in-situ measurement of temperature-sound.

4. BRIEF DESCRIPTION OF ACCOMPANY DRAWINGS

As shown in the accompanying drawings: 1 temperature sensing structure, 2 sound sensing structure, 3 first transmission fiber, 4 optical waveguide substrate, 5 first straight optical waveguide, 6 first Bragg grating, 7 second transmission fiber, 8 third Bragg grating, 9 second straight optical waveguide, 10 second Bragg grating, 11 upper cladding air groove, 12 third Bragg grating, 13 fourth transmission fiber, 14 silicon dioxide layer, 15 germanium-doped silicon dioxide layer, 16 upper cladding, 17 silicon substrate, 18 photomask, 19 light source, 20 first signal analyzer, 21 second signal analyzer, 22 signal processor, 23 double-parameter in-situ sensor based on waveguide grating optical grating, 24 alignment plate.

5. SPECIFIC EMBODIMENT OF THE INVENTION

In order to illustrate the purpose, technical scheme and advantages of the embodiments of the invention more clearly, the technical scheme of the preferred embodiments is further described clearly and completely. Obviously, only partial embodiments of the invention are shown and the actual structure is not limited thereto. All other embodiments, which can be obtained by those skilled in the art without making any creative effort based on the embodiments in the present invention, shall all fall within the protective scope of the invention.

Embodiment 1

Figure 1:
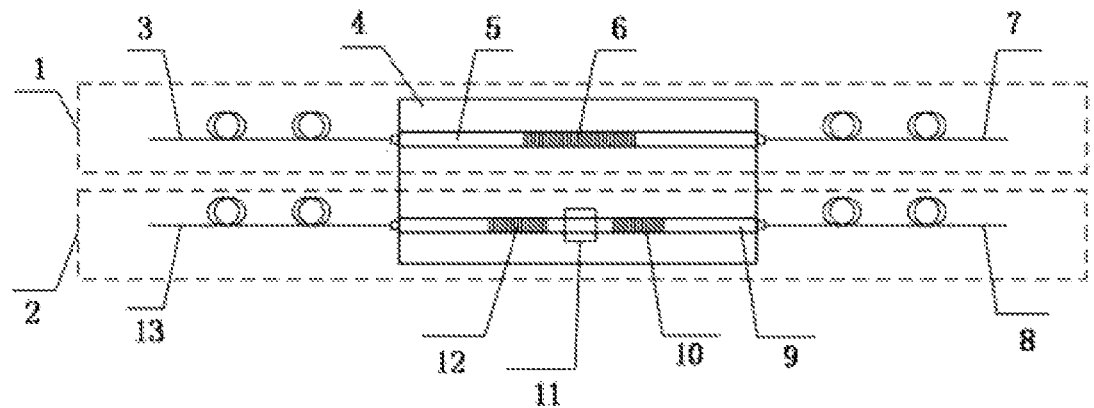
FIG. 1 is the top view of the double-parameter in-situ sensor based on waveguide grating provided by embodiment 1 of the invention.
Figure 2:
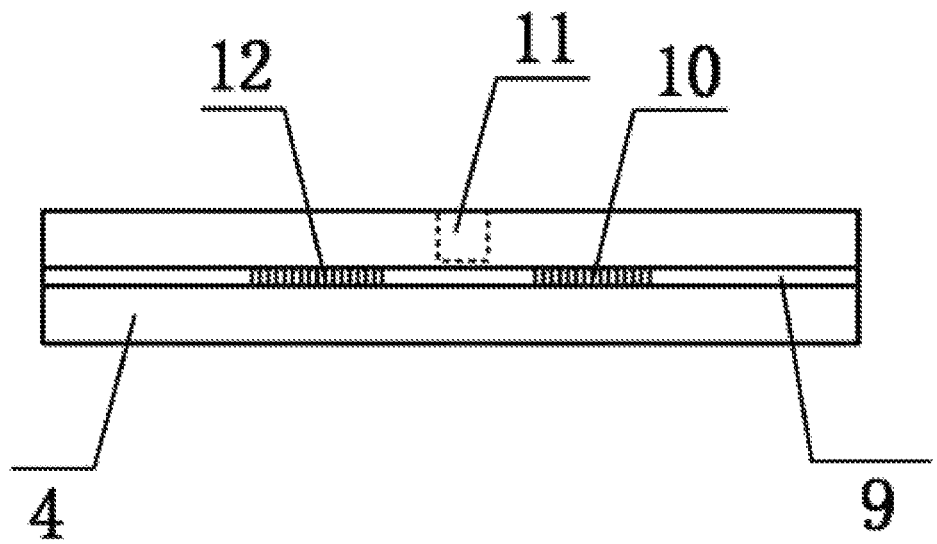
FIG. 2 is the section view of FIG. 1.
Figure 3:
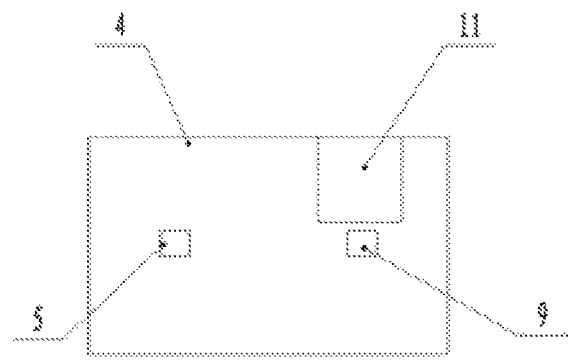
FIG. 3 is the left view of FIG. 1.

As is shown from FIG. 1 to FIG. 3, the invention provides a double-parameter in-situ sensor based on waveguide grating, comprising an optical waveguide substrate 4, wherein a first straight optical waveguide 5 and a second straight optical waveguide 9 are arranged in the optical waveguide substrate 4 in parallel, two ends of the first straight optical waveguide are respectively connected with a first transmission fiber 3 and a second transmission fiber 7, two ends of the second straight optical waveguide 9 are respectively connected with a third transmission fiber 8 and a fourth transmission fiber 13, a first Bragg grating 6 is arranged on the first straight optical waveguide 5, a second Bragg grating 10 and a third Bragg grating 12 are separately arranged on the second straight optical waveguide 9, a micro air groove 11 is arranged on the upper surface of the optical waveguide substrate 4, and is positioned between the second Bragg grating 10 and the third Bragg grating 12.

Specifically, in the embodiment, the first straight optical waveguide 5 and second straight optical waveguide 9 are linear structure formed by solid germanium-doped silicon dioxide crystal, the material for said optical waveguide substrate 4 is silicon dioxide.

Specifically, in the embodiment, the reflectivity of said second Bragg grating 10 and third Bragg grating 12 is more than 60%.

Specifically, in the embodiment, the reflectivity of said first Bragg grating 6 is more than 60%.

The double-parameter in-situ sensor based on waveguide grating provided by the embodiment has an integrated structure, comprising a temperature sensing structure and a sound sensing structure, the working principles of each structure is as follow:

1) Temperature sensing structure: the first straight optical waveguide 5 disposed in the optical waveguide substrate and the first Bragg grating 6 etched on the first straight optical waveguides 5 form the temperature sensing structure 1, light being input from one end of the first straight optical waveguides 5 and output from the other end thereof through the transmission fiber; when the wavelength of light is scanned around the central wavelength of the Bragg grating, most of the light is reflected at the Bragg grating, and less of the light is transmitted from the other end and output through the second transmission fiber. When the temperature changes, the central wavelength of the Bragg grating reflected light changes, so that the temperature is sensed. In the process, Bragg grating is used for obtaining a large-bandwidth high-reflection spectrum, so that sensing detection in a high-temperature environment is realized. The sensor is composed of temperature sensing structure, and the whole sensor is characterized in that each part is only sensitive to specific physical quantity, and the temperature sensing structure has temperature compensation effect on acoustic signal sensing.

Figure 4:
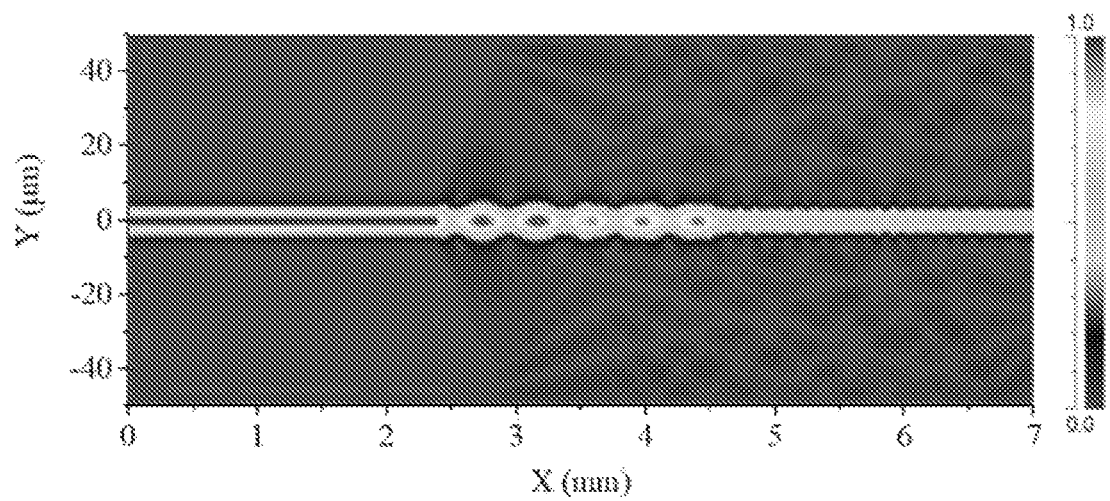
FIG. 4 is the luminous-intensity distribution view illustrating the transmission of optical field in temperature sensing structure of embodiment 1 of the invention.
Figure 5:
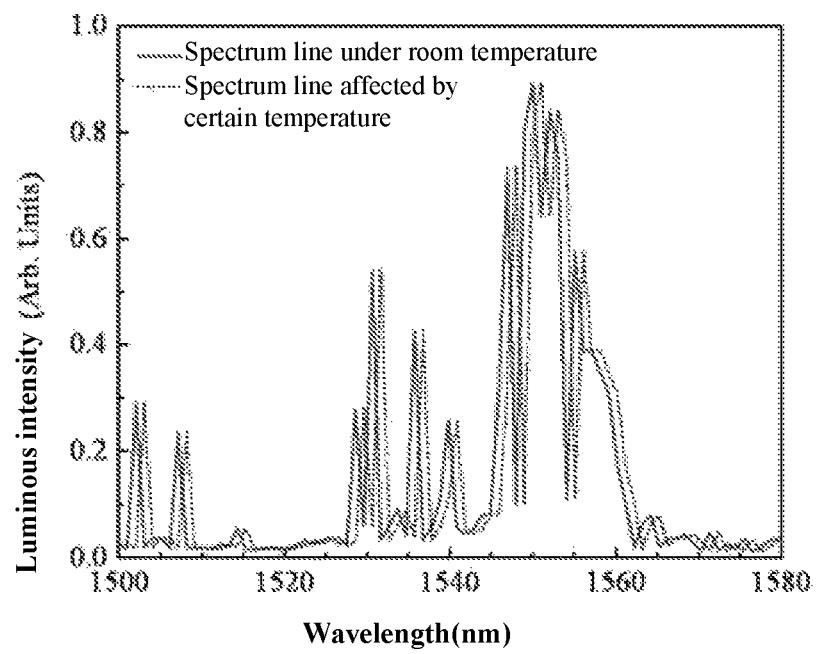
FIG. 5 is the diagram illustrating spectral line output in the first straight waveguide of embodiment 1 of the invention.
Figure 6:
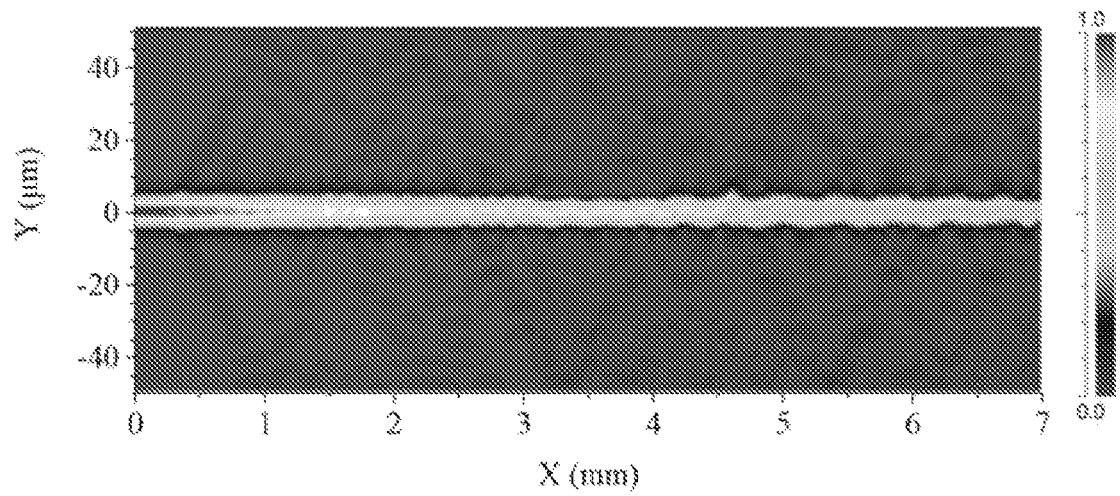
FIG. 6 is the luminous-intensity distribution view illustrating the transmission of optical field in sound sensing structure of embodiment 1 of the invention.
Figure 7:
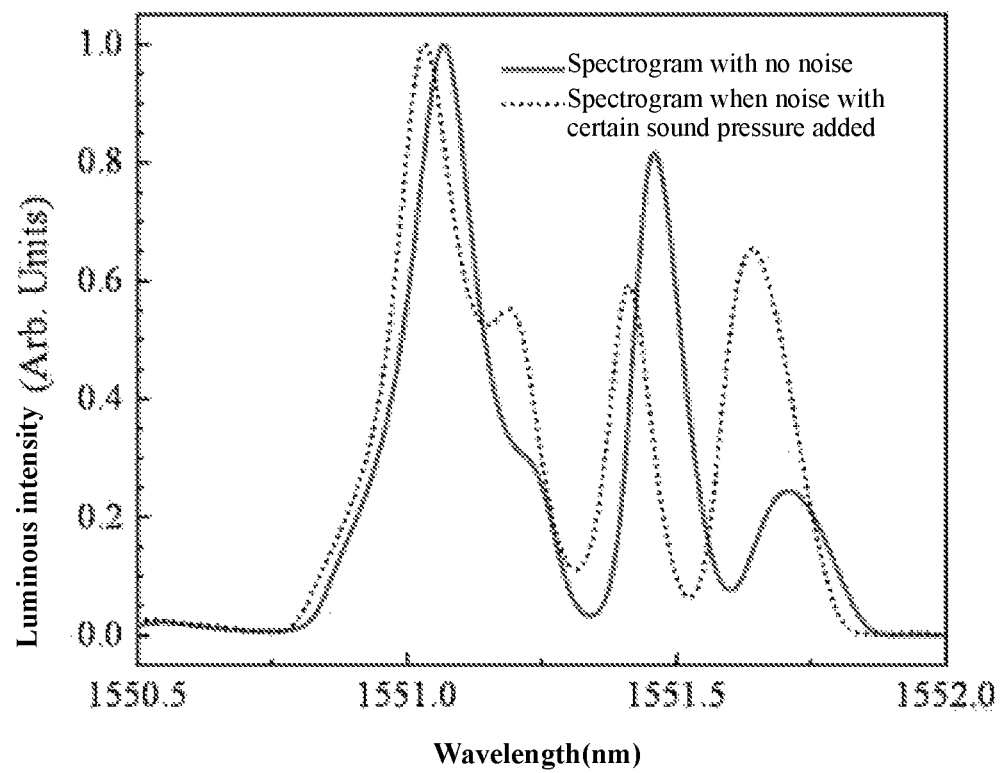
FIG. 7 is the diagram illustrating spectral line output in the second straight waveguide of embodiment 1 of the invention.

FIG. 4 is luminous-intensity distribution view illustrating the transmission of optical field in temperature sensing structure; FIG. 5 is the diagram illustrating spectral line output from the first straight waveguide 5; when the temperature changes, the spectral line output from the first straight waveguide 5 have a certain wavelength shift, and the temperature sensing can be realized via the wavelength shift amount of the spectral lines.

2) Sound sensing structure: the second straight optical waveguide 9, the second Bragg grating 10 and the third Bragg grating 12 disposed on the second straight optical waveguide 9, and the micro air groove 11 form the sound sensing structure 2. The second Bragg grating and the third Bragg grating with high reflectivity form Fabry-Perot cavity structure. When the upper cladding of Fabry-Perot chamber is influenced by the acoustic pressure and air density changes, it can arouse the change of air refractive index, and acoustic signal can be detected by monitoring the resonant wavelength of light waveguide Fabry-Perot cavity. Wherein, light is input from one end of the second straight optical waveguide 9 via transmission fiber, then it gets into Fabry-Perot cavity through second Bragg grating to form the resonance spectrum through multiple reflection and multi-beam interference between third Bragg grating 12 and second Bragg grating 10, namely resonating with Fabry-Perot cavity. At the same time, evanescent waves generated at the critical position of the second straight optical waveguide 9 and the air groove 11 spread along the bottom end of the air groove, and the amplitude of the evanescent waves is exponentially attenuated along with the increase of the depth perpendicular to the interface. When an external acoustic signal acts on the micro air groove 11, the change of the air medium density may cause a change of the refractive index of the air, and this change is fed back into the resonant effect of the Fabry-Perot cavity by evanescent waves, further affecting the spread of resonant light beam in the Fabry-Perot cavity, and finally causing drift of the resonant frequency of the Fabry-Perot cavity, so as to detect the acoustic signal. The Bragg grating with high reflectivity at both ends is used for intensifying the reflection of light in the Fabry-Perot cavity, improving fineness in the Fabry-Perot cavity, and increasing the sensitivity of sound detection.

To sum up, the invention provides a double-parameter in-situ sensor based on waveguide grating, whose structure is integrated; all made of silicon dioxide crystal featuring certain high temperature resistance and can realize sensing with high temperature below 500° C. Besides, two-parameter signal transmission and sensing are homogeneous material of silicon dioxide crystal, which can eliminate high-temperature stress mismatch of different materials, ensure high-reliability work of the sensor under high-temperature conditions. At the same time, the temperature sensing structure is the first Bragg grating on solid silicon dioxide crystal; the sound sensing structure is Fabry-Perot structure formed by the second Bragg grating and the third Bragg grating, and a micro air groove 11 is arranged at the upper end. There is no sealed cavity structure in two sensing structures, ensuring the high-reliability work of the sensors under the high-pressure condition. In addition, two sensing structures are mutually independent so as to avoid the problem of cross coupling of two parameters; meanwhile, the integrated structure of double parameter integration has small volume, and can realize the time-space synchronous in-situ measurement of temperature-sound.

Embodiment 2

Figure 8:
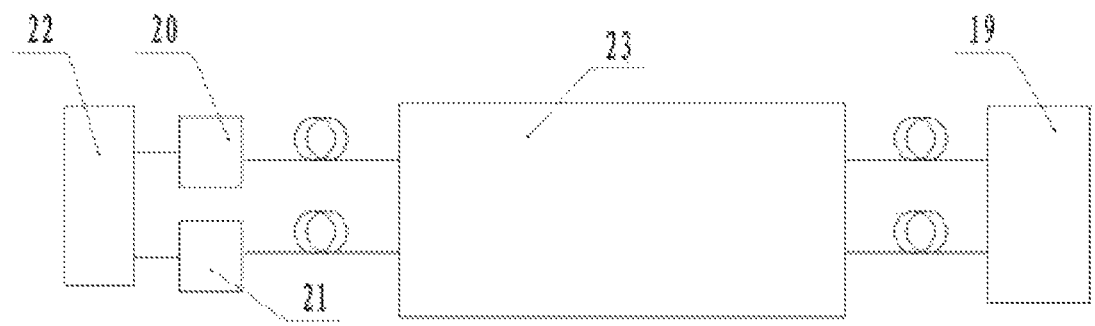
FIG. 8 is the structural diagram of the double-parameter sensing system based on waveguide grating provided by embodiment 2 of the invention.

As is shown in FIG. 8, the embodiment 2 of the invention provides a double-parameter sensing system based on waveguide grating comprising a light source 19, a first signal analyzer 20, a second signal analyzer 21, a signal processor 22 and a double-parameter in-situ sensor based on waveguide grating optical grating 23. Said light source 19 is used to provide optical signal for said first transmission fiber 3 and fourth transmission fiber 13; said first signal analyzer 20 is used to receive the optical signal output by second transmission fiber 7, and obtain the first optical spectrum; said second signal analyzer 21 is used to receive the optical signal output by third transmission fiber 8, and obtain the second optical spectrum; said signal processor 22 is used to calculate according to said first optical spectrum to obtain the temperature signal, and to calculate according to said second optical spectrum to obtain the acoustic signal;

Embodiment 3

Figure 9:
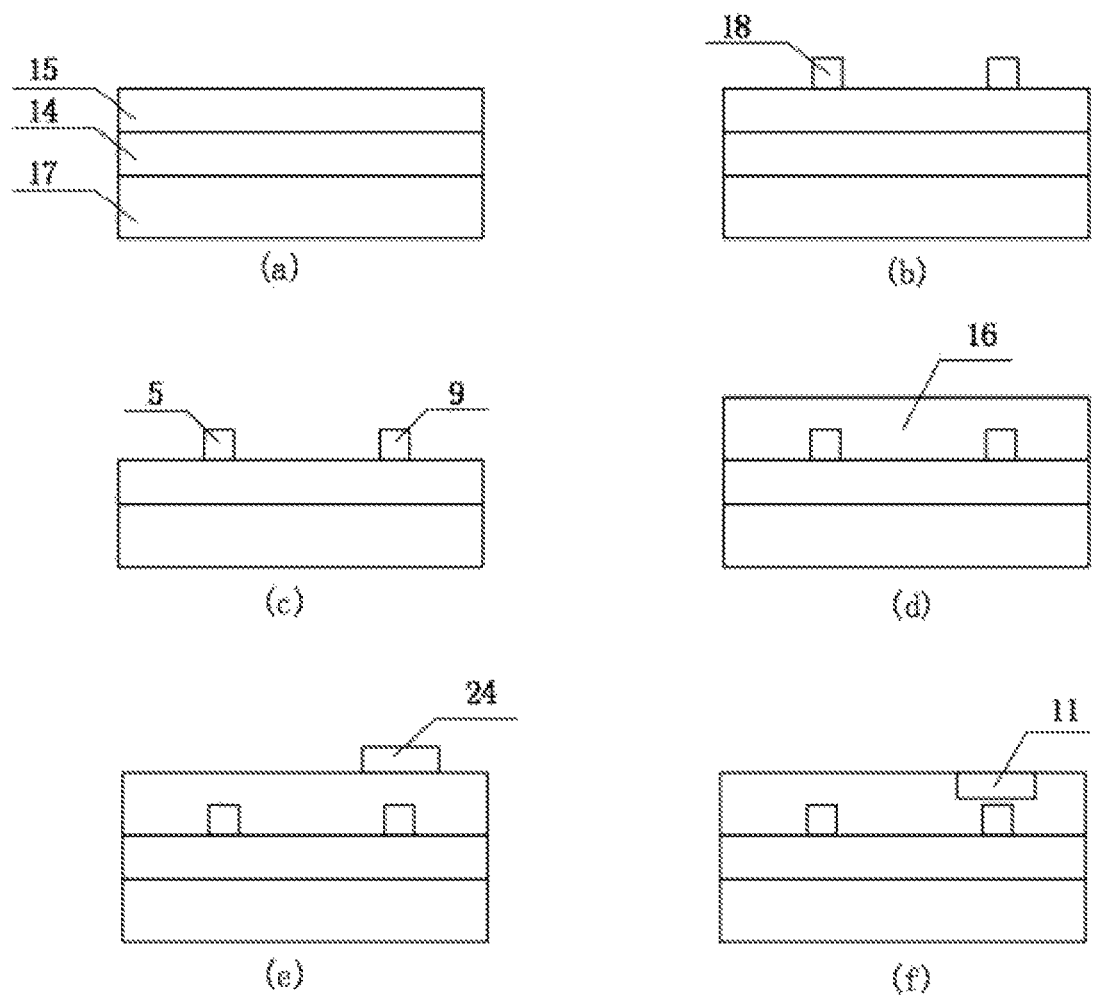
FIG. 9 is the flow diagram illustrating the preparation method for the double-parameter in-situ sensor based on waveguide grating provided by embodiment 3 of the invention.

As is shown in FIG. 9, the embodiment 3 of the invention provides a preparation method for a double-parameter sensor based on waveguide grating to prepare said double-parameter in-situ sensor based on waveguide grating, comprising the following steps:

S1. Growing silicon dioxide on the silicon substrate 17 to form silicon dioxide layer 14, and growing germanium-doped silicon dioxide on the silicon dioxide layer 14 to form germanium-doped silicon dioxide layer 15, as is shown in FIG. 9(a);

Specifically, in said step S1, the thickness of silicon dioxide layer 14 is 15±31 μm, while the thickness of germanium-doped silicon dioxide 15 is 6.5±21 μm. After growing is completed, high temperature annealing on the whole structure with temperature of 900° C.-1100° C. for 35 hours.

S2. Arranging a photomask 18 on the germanium-doped silicon dioxide layer 15, etching the redundant germanium-doped silicon dioxide by reactive ion etching, and forming a first straight optical waveguide 5 and a second straight optical waveguide 9 on the silicon dioxide layer 14, as is shown in (b) and (c) of FIG. 9;

Specifically, adopting photomask with core pattern to form photomask layer on the surface of germanium-doped silicon dioxide and coating photoresist on the photomask; transferring the geometrical shape on the photomask to the photoresist through photolithography technique; then etching the places covered with no photoresist through reactive ion etching and getting rid of the photoresist; then etching the germanium-doped silicon dioxide by reactive ion etching to obtain the cores, namely first straight optical waveguide 5 and second straight optical waveguide 9.

S3. Growing silicon dioxide on the silicon dioxide layer 14 by using plasma enhanced chemical vapor deposition method to form an upper cladding 16, being treated with high-temperature and reflux, as is shown in FIG. 9(c), the first straight optical waveguide 5 and second straight optical waveguide 9 are coated by the upper cladding 16 and the silicon dioxide layer 14, and form the optical waveguide substrate 4.

S4. Arranging an alignment plate, and etching the upper surface of the upper cladding 16 by reactive ion etching to form a micro air groove 11;

Specifically, adopting alignment plate with micro groove pattern to form photomask layer on the surface of germanium-doped silicon dioxide and coating photoresist on the photomask; transferring the geometrical shape on the alignment plate to the photoresist through photolithography technique; then etching the photomask layer through reactive ion etching and getting rid of the photoresist; then etching the silicon dioxide by reactive ion etching to obtain the micro air groove 11. The depth of said micro air groove 11 is smaller than the thickness of said upper cladding 16.

S5. Coupling transmission fibers at two ends of the first straight optical waveguide 5 and the second straight optical waveguide 9.

Specifically, the optical fiber splice is placed at both ends of the optical waveguide, and the optical fiber splice and the optical waveguide are fixed on the fixture of the six-dimensional electric displacement platform; the optical waveguide is adjusted to the horizontal position first, and then the fiber at one end of the optical waveguide is adjusted so that the laser power through the optical waveguide is maximized, i.e., the coupling loss of light is minimized, and then coupled with high-temperature UV adhesive, and the adhesive is cured for 24 hours; the fiber at the other end of the optical waveguide is adjusted so that the light through the optical waveguide is maximized, and then coupled with high-temperature UV adhesive, the adhesive is cured for 24 hours, which makes the coupling of the transmission fiber to the waveguide optimal.

S6. Respectively inscribing the first straight optical waveguide 5 and the second straight optical waveguide 9 by using the line-by-line scanning method of femtosecond laser to form the first Bragg grating 6, second Bragg grating 10 and third Bragg grating 12.

After the coupling of the transmission fiber to the waveguide is completed, the refractive index modulation region is formed by inscribing gratings that meet the reflectivity requirements on the straight waveguide by using the line-by-line scanning method of femtosecond laser. A set of gratings is inscribed in the temperature sensing unit, while two high-reflectivity grating regions in the sound sensing unit form the Fabry-Perot cavity to form a multi-beam interference, thus preparing a standardized temperature-sound double-parameter integrated in-situ sensor.

It should be noted that above embodiments are intended only to illustrate the technical solutions of the invention, and not to limit them; although the invention is described in detail with reference to the preceding embodiments, it should be understood by those of skilled in the art that it is still possible to modify the technical solutions recorded in the preceding embodiments or to make equivalent substitutions for some or all of the technical features thereof; and that these modifications or substitutions do not take the essence of the corresponding technical solutions out of the scope of the technical solutions of the embodiments of the invention.

The invention claimed is:

1. A double-parameter in-situ sensor based on waveguide grating, comprising an optical waveguide substrate (4), wherein a first straight optical waveguide (5) and a second straight optical waveguide (9) are arranged in the optical waveguide substrate (4) in parallel, two ends of the first straight optical waveguide (5) are respectively connected with a first transmission fiber (3) and a second transmission fiber (7), two ends of the second straight optical waveguide (9) are respectively connected with a third transmission fiber (8) and a fourth transmission fiber (13), a first Bragg grating (6) is arranged on the first straight optical waveguide (5), a second Bragg grating (10) and a third Bragg grating (12) are separately arranged on the second straight optical waveguide (9), a micro air groove (11) is arranged on the upper surface of the optical waveguide substrate (4), and is positioned between the second Bragg grating (10) and the third Bragg grating (12).

2. The double-parameter in-situ sensor based on waveguide grating according to claim 1 wherein the first straight optical waveguide (5) and second straight optical waveguide (9) are solid germanium-doped silicon dioxide crystal.

3. The double-parameter in-situ sensor based on waveguide grating according to claim 1 wherein the material for said optical waveguide substrate (4) is silicon dioxide.

4. The double-parameter in-situ sensor based on waveguide grating according to claim 1 wherein the reflectivity of said second Bragg grating (10) and third Bragg grating (12) is more than 60%.

5. The double-parameter in-situ sensor based on waveguide grating according to claim 1 wherein the reflectivity of said first Bragg grating (6) is more than 60%.

6. A double-parameter in-situ sensing system based on waveguide grating comprising a light source, a first signal analyzer, a second signal analyzer, a signal processor and a double-parameter in-situ sensor based on waveguide grating optical grating of claim 1;

said light source is used to provide optical signal for said first transmission fiber (3) and fourth transmission fiber (13); said first signal analyzer is used to receive the optical signal output by second transmission fiber (7), and obtain a first optical spectrum; said second signal analyzer is used to receive the optical signal output by third transmission fiber (8), and obtain a second optical spectrum;

said signal processor is used to calculate according to said first optical spectrum to obtain temperature signal, and to calculate according to said second optical spectrum to obtain acoustic signal.

7. A preparation method for a double-parameter sensor based on waveguide grating to prepare the double-parameter in-situ sensor based on waveguide grating of claim 1, comprising the following steps:

S1. Growing silicon dioxide on silicon substrate (17) to form silicon dioxide layer (14), and growing germanium-doped silicon dioxide on the silicon dioxide layer (14) to form germanium-doped silicon dioxide layer (15);

S2. Arranging a photomask on the germanium-doped silicon dioxide layer (15), etching redundant germanium-doped silicon dioxide by reactive ion etching, and forming a first straight optical waveguide (5) and a second straight optical waveguide (9) on the silicon dioxide layer (14);

S3. Growing silicon dioxide on the silicon dioxide layer (14) by using plasma enhanced chemical vapor deposition method to form an upper cladding (16);

S4. Arranging an alignment plate, and etching upper surface of the upper cladding (16) by reactive ion etching to form a micro air groove (11);

S5. Coupling transmission fibers at two ends of the first straight optical waveguide (5) and the second straight optical waveguide (9);

S6. Respectively inscribing the first straight optical waveguide (5) and the second straight optical waveguide (9) by using line-by-line scanning method of femtosecond laser to form the first Bragg grating (6), second Bragg grating (10) and third Bragg grating (12).

8. The preparation method for a double-parameter sensor based on waveguide grating according to claim 7 wherein in said step S1, the thickness of silicon dioxide layer (14) is 15±3 µm, while the thickness of germanium-doped silicon dioxide (15) is 6.5±2 µm.

9. The preparation method for a double-parameter sensor based on waveguide grating according to claim 7 wherein the depth of said micro air groove (11) is smaller than the thickness of said upper cladding (16).

* * * * *